US 7,537,351 B2

(12) United States Patent
Saito

(10) Patent No.: US 7,537,351 B2
(45) Date of Patent: May 26, 2009

(54) IMAGE FORMING PROJECTION SYSTEM AND PROJECTOR USING INPUT AND OUTPUT SIGNALS

(75) Inventor: Toshiki Saito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 475 days.

(21) Appl. No.: 11/377,190

(22) Filed: Mar. 17, 2006

(65) Prior Publication Data

US 2006/0215126 A1 Sep. 28, 2006

(30) Foreign Application Priority Data

Mar. 25, 2005 (JP) ............................ 2005-087915

(51) Int. Cl.
*G03B 21/14* (2006.01)
*G06K 9/40* (2006.01)

(52) U.S. Cl. .......................... 353/70; 382/255; 345/204

(58) Field of Classification Search .................. 353/69, 353/70; 382/255, 254; 345/204
See application file for complete search history.

(56) References Cited

U.S. PATENT DOCUMENTS

| 6,558,002 | B1 * | 5/2003 | Miyashita | ..................... 353/42 |
| 6,837,582 | B2 * | 1/2005 | Yamagishi | .................... 353/30 |
| 7,061,477 | B1 | 6/2006 | Noguchi | |

| 2003/0035590 | A1 | 2/2003 | Takeuchi et al. | |
| 2005/0219472 | A1 * | 10/2005 | Matsumoto | ................... 353/69 |

FOREIGN PATENT DOCUMENTS

| JP | A-2000-81593 | 3/2000 |
| JP | A-2001-125551 | 5/2001 |
| JP | 2002-091414 | 3/2002 |
| JP | 2003-032580 | 1/2003 |
| JP | A-2004-274283 | 9/2004 |

* cited by examiner

*Primary Examiner*—Diane I Lee
*Assistant Examiner*—Magda Cruz
(74) *Attorney, Agent, or Firm*—Oliff & Berridge, PLC

(57) ABSTRACT

A projection system includes a projector and a computer connected to the projector, wherein the projector projects an image according to an image information output from the computer. The projector includes an adjustment operation section that adjusts the settings of the projector and an adjustment operation identification section that identifies the adjustment operation indicated by an adjustment signal output from the adjustment operation section. The projector includes an adjustment-signal generating section that generates an adjustment signal on the basis of the adjustment operation identified by the adjustment operation identification section and a two-way communication section that sends the generated adjustment signal to the computer, and receives a signal from the computer. The computer includes a two-way communication section that receives the adjustment signal and sends a signal and an image processor that processes the image signal to be output according to the received adjustment signal.

6 Claims, 5 Drawing Sheets

IMAGE FORMING PROJECTION SYSTEM AND PROJECTOR USING INPUT AND OUTPUT SIGNALS

BACKGROUND

1. Technical Field

The present invention relates to projection systems and projectors for use in the projection systems. The projection systems include: a projector that modulates the light emitted from a light source according to image information to form an optical image, and projects the image in a magnified form, and a computer connected to the projector via a signal input and output terminal. In the projection systems the projector projects an image based on the image information output from the computer.

2. Related Art

Known projectors generally modulate the light emitted from a light source according to image information to form optical images, and project them in a magnified form. Such projectors form optical images on the basis of input image information by controlling light modulators such as liquid crystal panels, and project them in a magnified form.

The light modulators such as liquid crystal panels differ in their applied voltage—light transmittance characteristics from one to another. Accordingly, projectors are equipped with video processors so as to correct the color and brightness in the input image signal for the individual difference among the light modulators, thereby projecting images with appropriate brightness and color for the particular input image signals (for example, refer to Patent Document 1: JP-A-2003-32580, FIGS. 1 and 2, and [0031] to [0037]).

Projectors have operation buttons on their outer casings, and remote controllers. The user can adjust the quality of the projection images and zoom up displayed portions by operating the operation buttons or the remote controller.

In recent OA equipment, high-speed host computers or the like are connected to the OA equipment over networks so as to increase processing efficiency over the networks using the processing speed of the host computers. For example, a technique for improving the operability of low-speed-processing external devices such as mobile phones is disclosed in which the external devices are connected to the host computers via networks to process part of the work of the external equipment using the host computers via the networks (for example, refer to Patent Document 2: JP-A-2002-91414, FIGS. 1 and 2, and [0040] to [0047]).

Further, by this host computer utilization method, part of the image processing for the projector is done by the computer connected to the projector, so that the image processing done by the project is reduced. In this way, it is possible increase the speed of processing and decrease the cost of the projector, an aid for presentations given using projectors.

However, in such projection systems in which connected computers perform image processing, image quality adjustment and the like is done largely by the computer. Accordingly, even when operation buttons or remote controllers are used to adjust image quality, adjustment cannot be carried out based on such adjustment operation signals detected in the projector.

SUMMARY

An advantage of some aspects of the invention is to provide a projection system including: a projector that modulates the light emitted from a light source according to image information to form an optical image and projects the image in a magnified form; and a computer connected to the projector via a signal input and output terminal, and a projector, wherein even with a structure in which image processing is executed by the computer, settings on image quality can be executed by the controller of the projector.

A projection system according to an aspect of the invention includes: a projector that modulates the light emitted from a light source according to image information to form an optical image and projects the image in a magnified form; and a computer connected to the projector via a signal input and output terminal, wherein the projector projects the image according to the image information output from the computer. The projector includes: an adjustment operation section that adjusts the settings on the projector; an adjustment operation identification section that identifies the adjustment operation indicated by the adjustment operation signal output from the adjustment operation section; an adjustment-signal generating section that generates an adjustment signal on the basis of the adjustment operation identified by the adjustment operation identification section; and a two-way communication section that sends the generated adjustment signal to the computer, and receives a signal from the computer. The computer includes: a two-way communication section that receives the adjustment signal from the projector and sends a signal; and an image processor that processes an image signal to be output, according to the received adjustment signal.

Various methods can be employed to connect the projector to the computer; for example, a method of connection via a USB-based input and output terminal, a power line communication (PLC) method providing the projector with a power feeder sending electricity from an outlet etc. to an external device, in this case a computer, or a method of connection with a home server via a radio LAN.

According to an aspect of the invention, the projector includes an adjustment operation identification section, an adjustment-signal generating section, and a two-way communication section, and the computer includes a two-way communication section and an image processor. Accordingly, the operation by the operation section, such as a remote controller, can be sent to the computer via the two-way communication section, allowing the computer to set image quality etc. according to the operation.

It is preferable that the image processor includes an adjustment-information display section outputting adjustment information for adjusting the settings to be projected on the projector.

In this case, when the user operates a remote controller or the like, the adjustment-information display section allows the projector to display the present settings as a projection image, so that the user can set image quality etc. on the basis of the displayed adjustment information.

It is preferable that the projector includes no image processor that processes an input image signal.

This invention is advantageous particularly for a projector having no image processor, because operating devices such as a remote controller are normally unavailable for such a projector.

However, even when the projector has an image processor, this invention increases the usability because it makes it possible for higher-level image processing provided by the connected computer to be adjusted by the operation section such as a remote controller.

It is preferable that the projector includes an individual-difference-information storage section that stores the individual-difference-information of the projector light modulator properties; and that when the system starts, the two-way communication section outputs the individual-difference-information to the computer.

Here, the individual-difference-information indicates information for correcting deviation specific to a projector, such as a brightness-nonuniformity correction value, a chrominance-nonuniformity correction value, and a gamma correction value for the light modulator.

Without the individual-difference-information storage section, the computer cannot recognize the kind of projector to which it is connected. However, when individual-difference-information is output from the projector at startup, the computer can recognize the individual difference of the projector, allowing the image processor of the computer to adjustment the settings according to the individual difference of the projector.

It is preferable that the image processor includes a adjustment-information output section that outputs, when the system exits, the adjustment information set by the image processor to the projector via the two-way communication section of the computer; and that the projector includes an adjustment-information storage section that stores the input adjustment information.

In this case, when the system exits, adjustment information set by the image processor of the computer is stored in the projector. Accordingly, the computer can call the adjustment information at the next startup and adjustment the settings, thus providing an easy-to-use projection system.

A projector according to another aspect of the invention has the above-described projection system. Specifically, the projector is connected to a computer via a signal input and output terminal. The projector modulates the light emitted from a light source according to image information output from the computer to form an optical image, and projects the image in a magnified form. The projector includes: an adjustment operation section that adjusts the settings of the projector; an adjustment operation identification section that identifies the adjustment operation indicated in an adjustment operation signal output from the adjustment operation section; an adjustment-signal generating section that generates an adjustment signal on the basis of the adjustment operation identified by the adjustment operation identification section; and a two-way communication section that sends the generated adjustment signal to the computer, and receives a signal from the computer.

In this case, the settings on the projector can be made by the computer. This allows the adjustment of the settings by the projector to be omitted, thus reducing the processing by the projector and thus decreasing the production cost of the projector.

BRIEF DESCRIPTION OF THE DRAWINGS

The invention will be described with reference to the accompanying drawings, wherein like numbers reference like elements.

DESCRIPTION OF EXEMPLARY EMBODIMENT

The invention will be described with reference to the accompanying drawings, wherein like numbers reference like elements.

An embodiment of the invention will be described with reference to the drawings.

Figure 1:
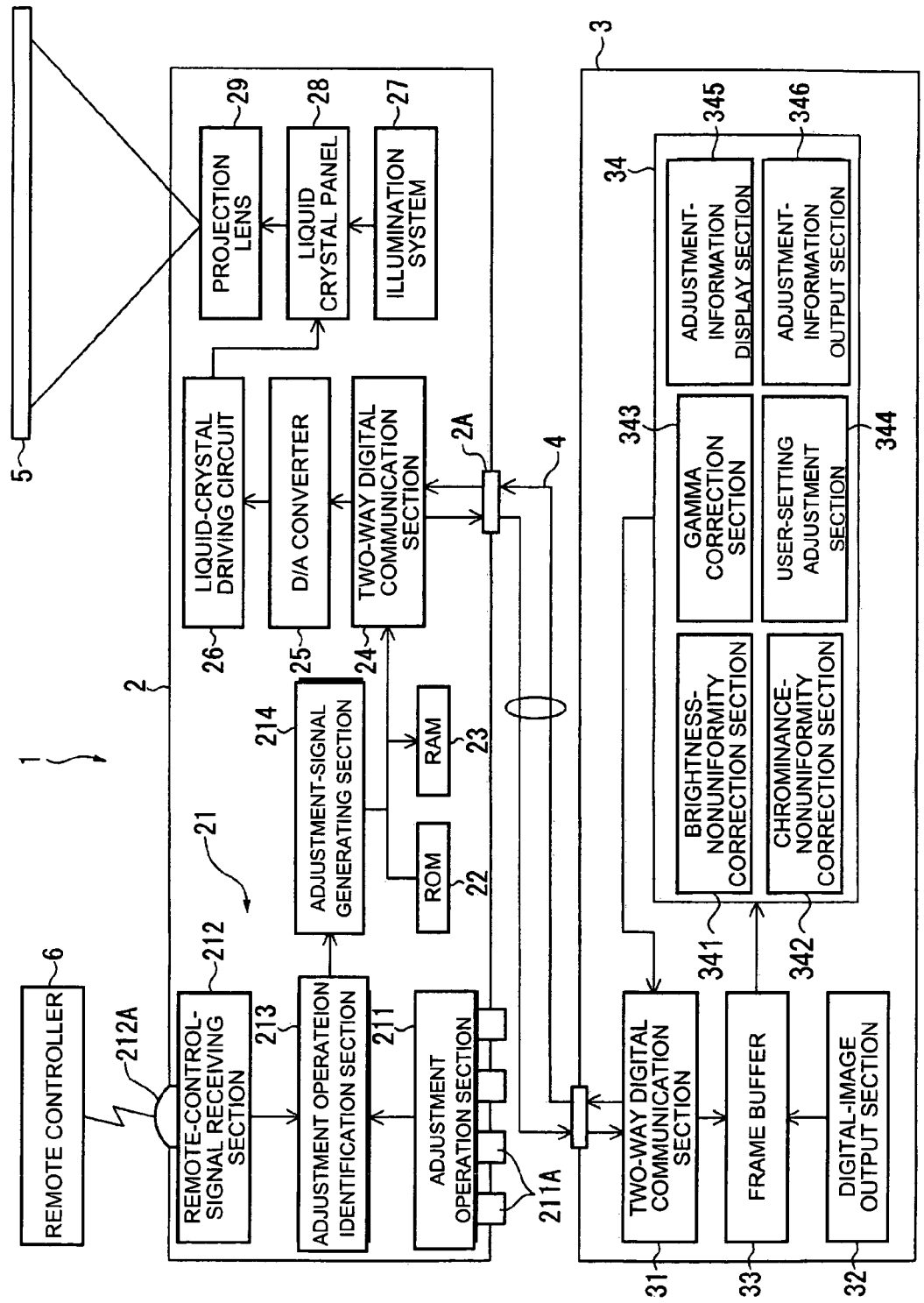
FIG. 1 is a block diagram of a projection system according to an embodiment of the invention.

FIG. 1 shows a projection system 1 according to an embodiment of the invention.

The projection system 1 is a device in which a projector 2 and a computer 3 are connected to each other with a USB cable 4. The projection system 1 outputs a digital image signal from the computer 3 to the projector 2 via the USB cable 4, and projects it on a screen 5.

The USB cable 4 is based on the USB 1.1 or USB 2.0 standard and is capable of two-way communication between connected devices.

1. Structure of the Projector

The projector 2 modulates the light emitted from a light source according to input image information to form an optical image, and projects the image on the screen 5 in a magnified form. The projector 2 includes a user operation system 21, a ROM 22, a RAM 23, a two-way digital communication section 24, a digital to analog converter 25, a liquid-crystal driving circuit 26, an illumination system 27, a liquid crystal panel 28, and a projection lens 29.

The user operation system 21 includes an adjustment operation section 211, a remote-control-signal receiving section 212, an adjustment operation identification section 213, and an adjustment-signal generating section 214.

The adjustment operation section 211 includes a plurality of operation buttons 211A exposed from the outer casing of the projector 2. When the user pushes the operation buttons 211A, the adjustment operation section 211 outputs the adjustment operation signal corresponding to the pushing operation to the adjustment operation identification section 213.

The remote-control-signal receiving section 212 includes a signal receiving section 212A exposed from the outer casing of the projector 2. When the user pushes the operation buttons of a remote controller 6, a radio signal is sent from the remote controller 6 to the signal receiving section 212A. Upon receiving the radio signal, the remote-control-signal receiving section 212 outputs the adjustment operation signal corresponding to the pushing operation to the adjustment operation identification section 213. For the communication between the remote controller 6 and the signal receiving section 212A, various systems can be employed, such as infrared communication based on the Infrared Data Application (IrDA) standard. The remote controller 6 and the remote-control-signal receiving section 212 can also be operated by the user, in another configuration.

The adjustment operation identification section 213 identifies what adjustment operation the user has made, based on the adjustment operation signal input from the adjustment operation section 211 or the remote-control-signal receiving section 212. As will be described later in detail, adjustment items are displayed on the screen 5, the user adjusts one of adjustment items displayed on the screen 5 by operating the operation buttons 211A or the remote controller 6, and confirms the operation by looking at the display again.

The adjustment operation identification section 213 outputs the identification of the adjustment operation to the adjustment-signal generating section 214.

The adjustment-signal generating section 214 generates an adjustment signal according to the identification of the adjustment operation by the adjustment operation identification section 213. The generated adjustment signal is output to the two-way digital communication section 24.

The ROM 22 serving as individual-difference-information storage section stores individual-difference information necessary for image processing of the projector 2. Specifically, the ROM 22 stores correction values specific to the projector 2, such as correction values for nonuniformity in brightness and color, and gamma correction values, for forming an optical image appropriate for the liquid crystal panel 28 in response to the input image signal.

The RAM 23 serving as adjustment-information storage section stores adjustment information including settings for image quality that the user has set using the remote controller 6 or the operation buttons 211A. The adjustment information is updated when the system exits, according to the adjustment information output from an adjustment-information output section 346 of an image processor 34 of the computer 3, to be described later. The RAM 23 is supplied with power from a battery etc. because it needs to store the adjustment information even when the projector 2 is during power off. This embodiment is configured with the RAM 23 separate from the ROM 22. However, the ROM 22 may be a writable ROM such as an EEPROM, and adjustment information can be written in a part thereof.

The two-way digital communication section 24 communicates bidirectionally with the computer 3 connected to a digital-signal input and output terminal 2A based on the USB standard via the USB cable 4. The two-way digital communication section 24 sends an adjustment signal generated by the adjustment-signal generating section 214, correction values stored in the ROM 22, etc. to the computer 3, and receives a digital image signal processed by the image processor 34 of the computer 3 and outputs it to the digital to analog converter 25.

The digital to analog converter 25 converts a processed digital signal output from the computer 3 to an analog signal. The analog signal converted by the digital to analog converter 25 is output to the liquid-crystal driving circuit 26.

The liquid-crystal driving circuit 26 controls the driving of the liquid crystal panel 28. The liquid-crystal driving circuit 26 controls the driving of pixels of the liquid crystal panel 28 in response to the input analog signal.

The projector 2 according to the embodiment has no frame buffer and no video processor for image processing at all. Thus, no device necessary for image processing is in the projector 2, thereby greatly reducing the production cost.

The illumination system 27 illuminates the liquid crystal panel 28, and includes a light source, a lens, and other optical elements such as a polarization conversion element. The light source (not shown) includes a light source lamp such as a high-pressure mercury arc lamp or a metal halide lamp, and a reflector that reflects the light emitted from the light source lamp in one direction.

The liquid crystal panel 28 (not shown) includes a liquid-crystal-panel body in which electrooptic liquid crystal is sealed between a pair of transparent substrates, and a pair of polarizers disposed on the light incident side and the light exiting side of the liquid-crystal panel body.

One of the pair of substrates has a structure in which a common electrode such as an indium tin oxide (ITO) film is formed on the liquid-crystal sealed surface. The other substrate has multiple data lines arranged in parallel, multiple scanning lines arranged in the direction perpendicular to the data lines, and a pixel electrode and a thin-film transistor (TFT) serving as a switching element disposed in the rectangular region between adjacent two data lines and two scanning lines.

The switching element is turned on and off in response to the driving signal from the liquid-crystal driving circuit 26 to change the light transmittance of the pixels of the liquid crystal panel 28 to form an optical image on the image forming region of the liquid crystal panel 28.

The projection lens 29 is a combination lens in which multiple lenses are disposed on the illumination optical axis set in the lens barrel. The modulated light exiting from the liquid crystal panel 28 is magnified by the projection lens 29 and projected on the screen 5.

2. Structure of the Computer

The computer 3 is a potable notebook computer having a central processing unit and a storage unit, and includes a two-way digital communication section 31, a digital-image output section 32, a frame buffer 33, and an image processor 34.

The two-way digital communication section 31 communicates bidirectionally with the projector 2 connected via the USB cable 4, as in the two-way digital communication section 24. The two-way digital communication section 31 receives a digital image signal input from a digital-signal input and output terminal 3A connected to the USB cable 4, and outputs a digital image signal processed by the image processor 34 to the projector 2.

The digital-image output section 32 outputs a digital image signal generated in the computer 3 and an image signal output from an image-information output device (not shown) connected directly to the computer 3 and digitized by the computer 3 to the frame buffer 33.

The frame buffer 33 accumulates the digital image signals output from the digital-image output section 32 on a frame-by-frame basis. The digital image signals accumulated frame by frame are output to the image processor 34.

The image processor 34 processes the input digital image signal on the basis of correction values and adjustment information stored in the ROM 22 and the RAM 23 and output from the projector 2, to generate a digital image signal appropriate for the liquid crystal panel 28. The image processor 34 includes a brightness-nonuniformity correction section 341, a chrominance-nonuniformity correction section 342, a gamma correction section 343, a user-setting adjustment section 344, an adjustment-information display section 345, and an adjustment-information output section 346.

The brightness-nonuniformity correction section 341 corrects the nonuniformity in the brightness of the image forming region of the liquid crystal panel 28 of the projector 2. Specifically, the brightness-nonuniformity correction section 341 appropriately corrects the brightness of each image forming region for the input digital image signal with reference to a table that provides brightness-nonuniformity correction values for each of the image forming regions of the liquid crystal panel 28.

The chrominance-nonuniformity correction section 342 corrects nonuniformity in the chrominance of the image forming regions of the liquid crystal panel 28 of the projector 2, in a manner similar to the brightness-nonuniformity correction section 341.

The gamma correction section 343 corrects voltage data to be output to the gray-level signal in the input digital image signal. The gamma correction section 343 is provided to correct the variation in light transmittance for the input gray level from pixel to pixel in the liquid crystal panel 28. Specifically, the gamma correction section 343 corrects the gray level of the input digital image signal with reference to the correction values stored in a look up table (LUT) that describes the correspondence between input gray levels and output gray levels (drive voltage).

The user-setting adjustment section 344 processes an input digital image signal in response to an adjustment signal output from the two-way digital communication section 24 of the projector 2. Items that the user can set include items that have an influence on images such as gamma characteristic, color, and refresh rate, and keystone correction of the keystone distortion that occurs when the screen 5 is not in correct position relative to the projector 2.

Figure 2:
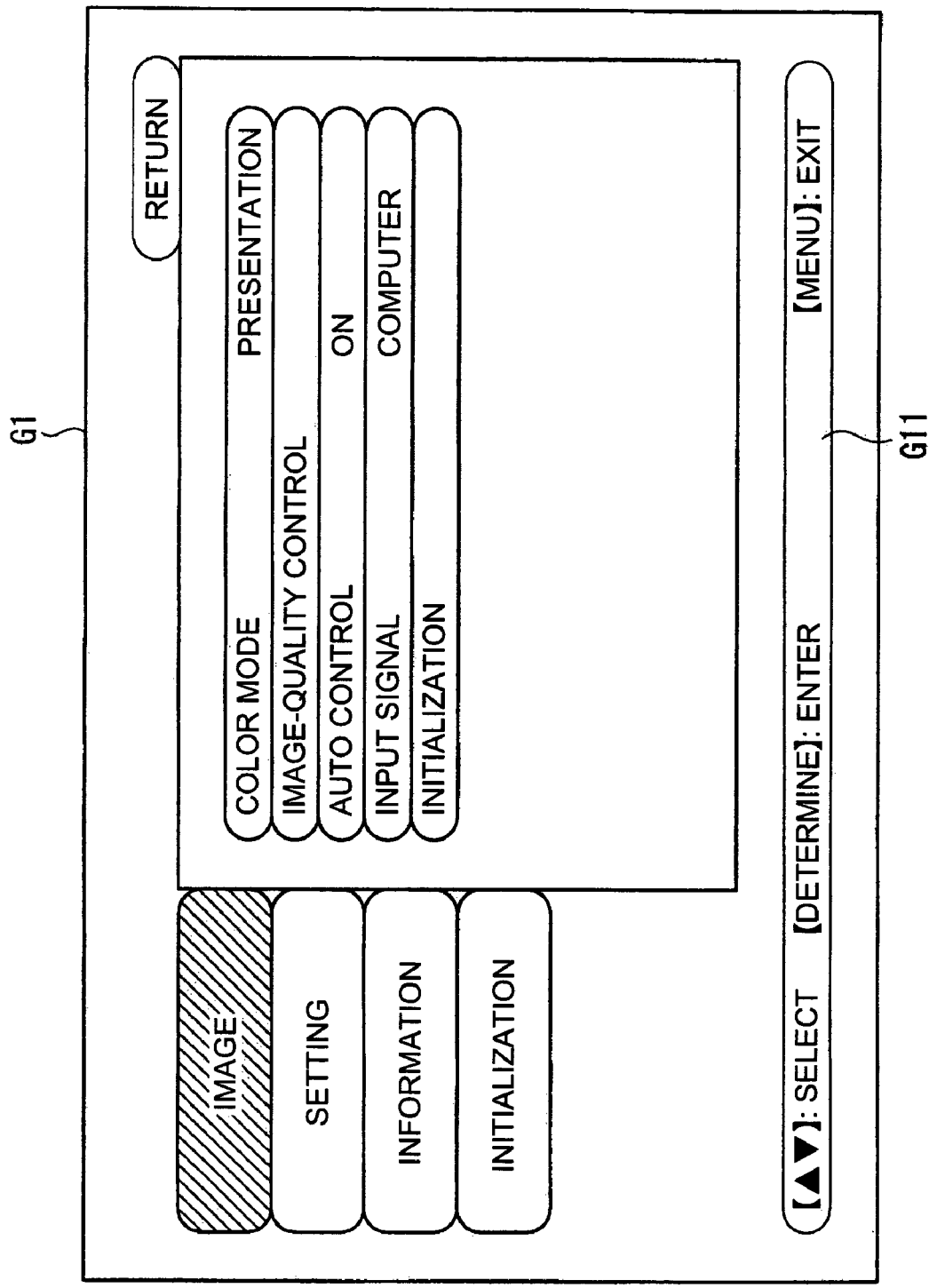
FIG. 2 is a schematic diagram of a screen example in which adjustment information according to the embodiment is displayed.

The adjustment-information display section 345 displays adjustment information for the user to select the adjustment items on the projected image. Specifically, when the user pushes a help button or the like on the remote controller 6, an adjustment-item selection screen G1 is displayed on the projection image, as shown in FIG. 2. As can be seen in FIG. 2, an operation guide region G11 is displayed at the lower part of the screen G1. The user can move the selection position in the region G1 with a direction button and make a decision with the enter button.

The adjustment-information output section 346 outputs adjustment information on the setting of image signals executed by the user-setting adjustment section 344 to the projector 2 via the two-way digital communication section 31 according to the setting on the adjustment item selected on the screen G1 displayed by the adjustment-information display section 345. The output of the adjustment information by the adjustment-information output section 346 is triggered at the time the power switch of the projector 2 is turned off to terminate the system.

At that time, the adjustment-information output section 346 acquires the adjustment information on the set items that influence images, such as a gamma characteristic, color, and a refresh rate, and outputs the adjustment information to the two-way digital communication section 31. The two-way digital communication section 31 sends the input adjustment information to the projector 2 via the USB cable 4. The two-way digital communication section 24 of the projector 2 writes the received adjustment information to the RAM 23 to update the adjustment information stored in the RAM 23.

3. Operation of the Projection System

The operation of the projection system 1 with the above-described structure will be described with reference to the flowchart shown in FIGS. 3 to 5.

3-1. Operations at Startup and at Adjustment Operation

Figure 3:
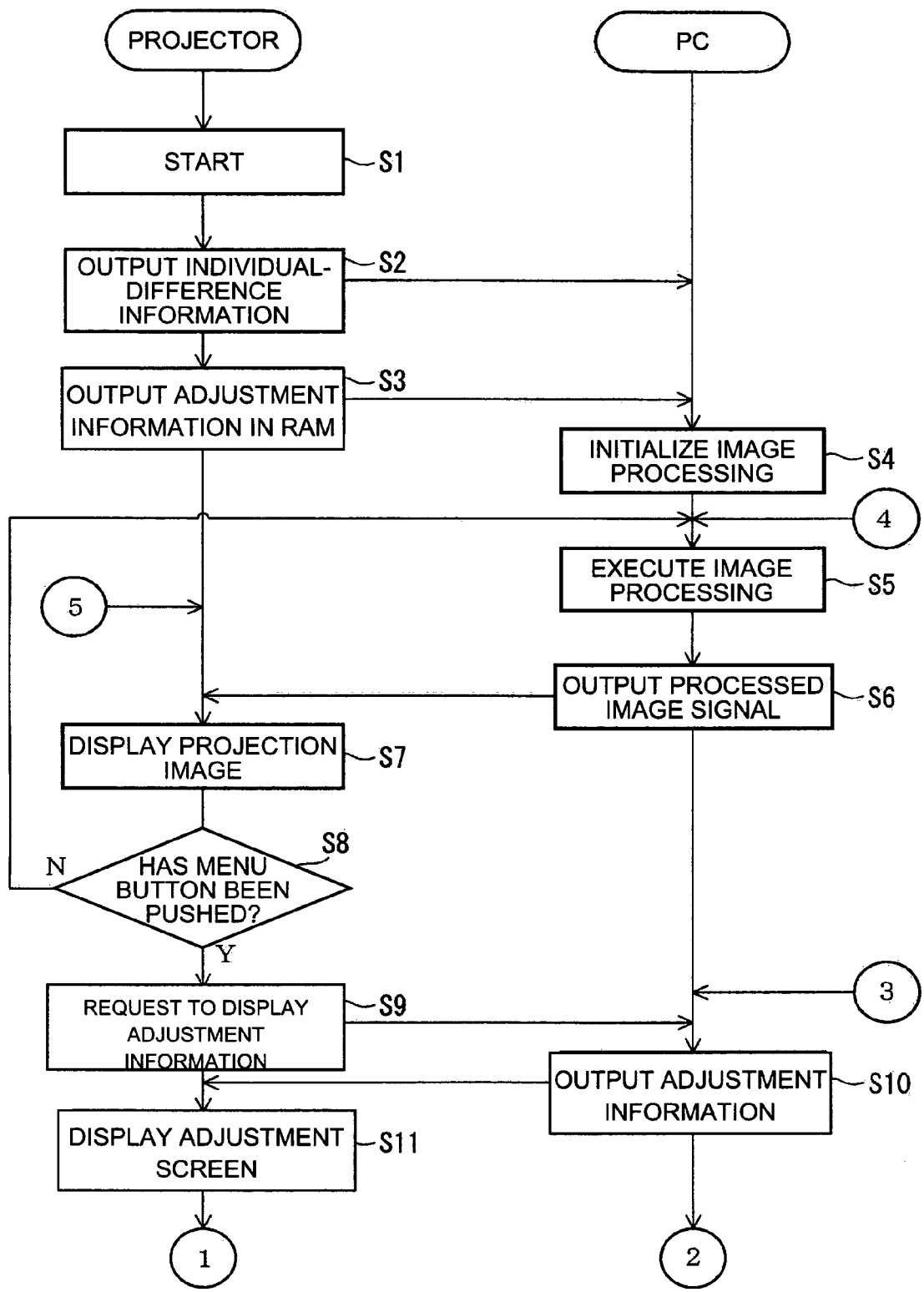
FIG. 3 is a flowchart for the operation of the projection system according to the embodiment.
Figure 4:
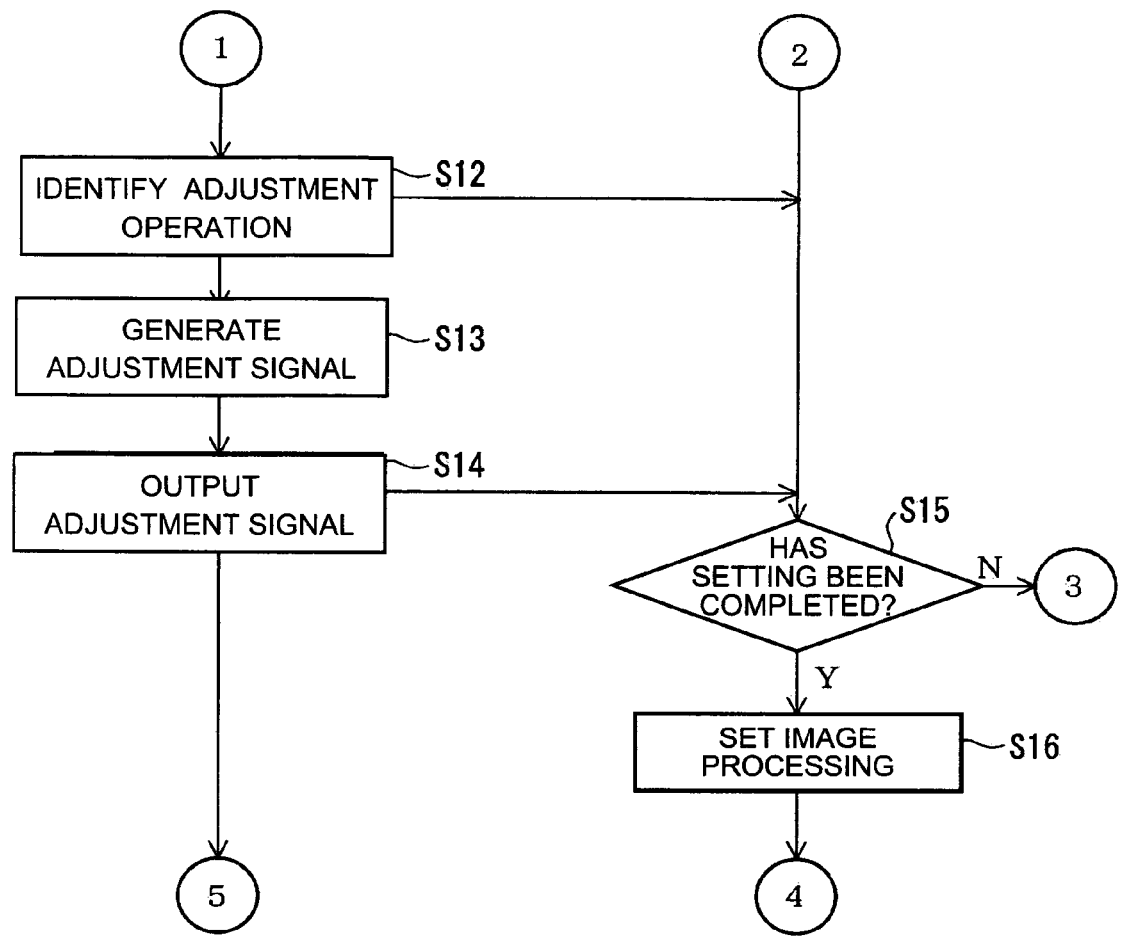
FIG. 4 is a flowchart for the operation of the projection system according to the embodiment.

When the projection system 1 is started and the adjustment operation is started, the processes shown in FIGS. 3 and 4 are executed.

Upon starting the projector 2 (S1), the two-way digital communication section 24 outputs the individual-difference information stored in the ROM 22 to the computer 3 (S2), and outputs the adjustment-information of the preceding adjustment stored in the RAM 23 to the computer 3 (S3).

Upon receiving the information, the two-way digital communication section 31 of the computer 3 outputs the information to the image processor 34. The brightness-nonuniformity correction section 341, the chrominance-nonuniformity correction section 342, the gamma correction section 343, and the user-setting adjustment section 344 of the image processor 34 initialize image processing conditions on the basis of the adjustment information (S4).

Upon completion of the initialization, the image processor 34 processes the digital image signal input from the digital-image output section 32, according to the settings on image processing (S5). The two-way digital communication section 31 sends the processed digital image signal to the projector 2 (S6).

Upon receiving the processed digital image signal, the two-way digital communication section 24 of the projector 2 outputs the received digital image signal to the digital to analog converter 25. The digital to analog converter 25 converts the digital image signal to an analog signal, and outputs it to the liquid-crystal driving circuit 26. The liquid-crystal driving circuit 26 adjusts the liquid crystal panel 28 in response to the analog signal to display a projection image on the screen 5 (S7).

When either the menu button of the remote controller 6 or the menu button of the operation buttons 211A is pushed (S8), the adjustment operation identification section 213 identifies that a menu display request has been made, and the adjustment-signal generating section 214 generates an adjustment signal serving as an adjustment-information display request. The two-way digital communication section 24 sends the adjustment-information display request to the computer 3 (S9).

When the adjustment-information display request is received by the computer 3, the adjustment-information display section 345 of the image processor 34 generates an adjustment-information display image. The two-way digital communication section 24 sends the image to the projector 2 (S10). Thus the projector 2 projects the screen G1, as shown in FIG. 2 (S11).

After the screen G1 has been displayed, the adjustment operation identification section 213 monitors the state of the operation button of the remote controller 6 or the operation buttons 211A of the adjustment operation section 211 to identify the operation made (S12). Specifically, when the user operates a specified operation button, the adjustment operation identification section 213 identifies the operation.

The adjustment-signal generating section 214 then generates an adjustment control signal based on the identification by the adjustment operation identification section 213 (S13).

The generated adjustment control signal is sent to the computer 3 by the two-way digital communication section 24 (S14).

The adjustment-information display section 345 updates the adjustment-information display image according to the adjustment signal sent from the projector 2, and output it in succession. For example, when the up or down direction button is operated, the adjustment item under control shifts. When the enter button is pushed on the screen shown in FIG. 2, the menu of the item below the item just entered is displayed.

The adjustment-information display section 345 thus monitors whether the final setting adjustment has been completed while updating the screen G1 as appropriate (S15). When the setting adjustment by the user has been completed, the newly set image-processing condition is carried out (S16), and image processing is started on the basis of the settings on the image processing.

3-2. Operation for Terminating the System

Figure 5:
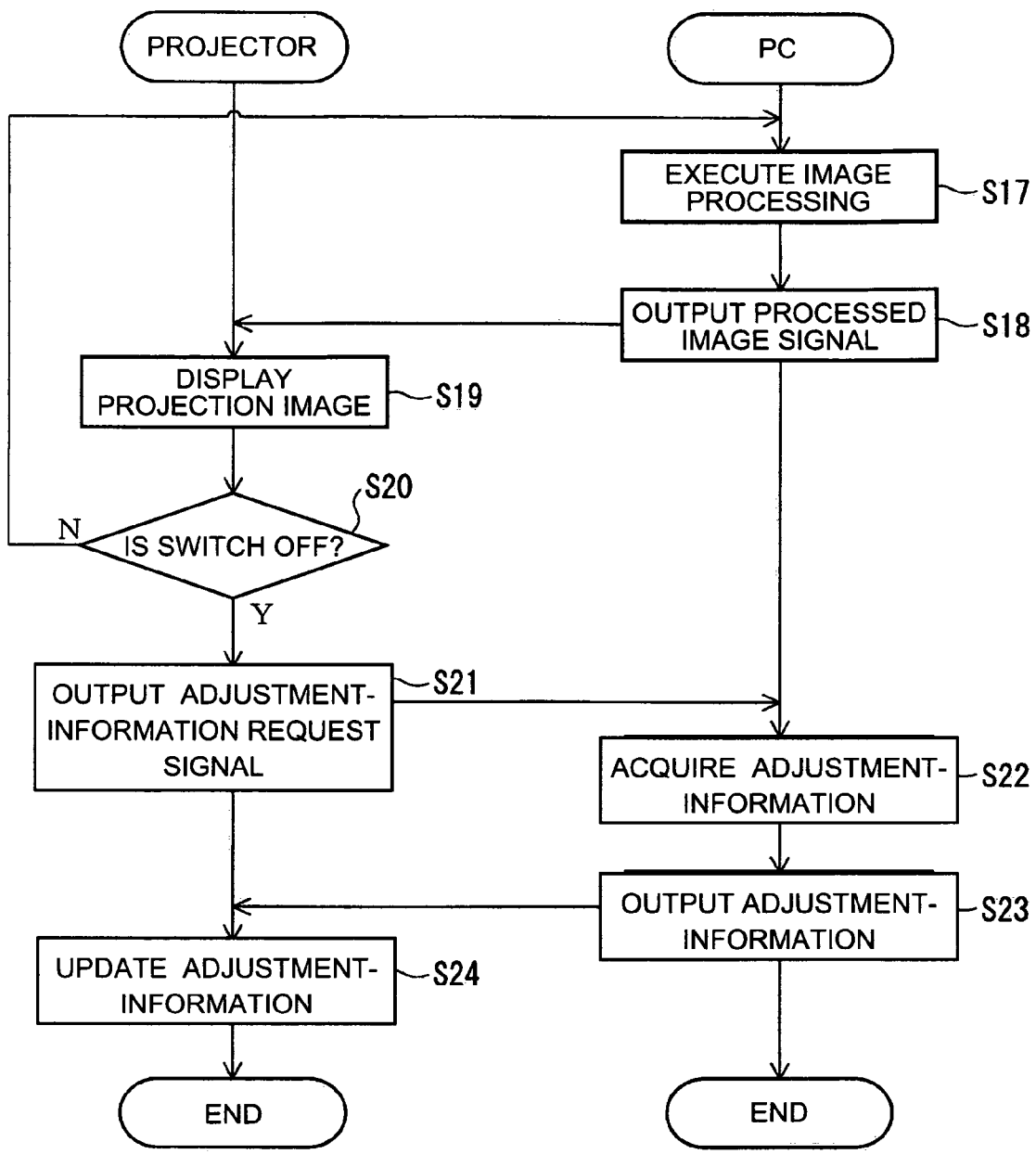
FIG. 5 is a flowchart for the operation of the projection system according to the embodiment.

For termination of the projection system 1, the process shown in the flowchart of FIG. 5 is executed.

The adjustment operation identification section 213 monitors the on/off state of the power switch of the projector 2 (S20) while the image processing by the computer 3 (S17), the output of the processed image signal (S18), and the displaying of the projection image by the projector 2 (S19) are being executed.

When the adjustment operation identification section 213 identifies that the power switch has been turned off, the adjustment-signal generating section 214 generates an adjustment-information request signal. The generated adjustment-information request signal is sent to the computer 3 by the two-way digital communication section 24 (S21).

When the adjustment-information request signal sent from the projector 2 is input to the image processor 34 via the two-way digital communication section 31, the adjustment-information output section 346 acquires the present adjustment information set in the user-setting adjustment section 344 (S22).

The adjustment-information output section 346 sends the acquired adjustment information to the projector 2 (S23). The adjustment information is written in the RAM 23 via the two-way digital communication section 31. Thus the adjustment information in the RAM 23 is updated (S24).

4. Modifications

It is to be understood that the invention is not limited to the foregoing embodiment but may include the following modifications.

Although the liquid crystal panel 28 according to the embodiment is a single plate projector, the invention is not limited to that, but may be a projector including a three-plate liquid crystal panel. In this case, the individual-difference information on the projector 2 set in the ROM 22 may be that of the liquid crystal panels.

Although the embodiment employs the liquid crystal panel 28 as a light modulator, the invention is not limited to that, but may use a digital light processor (DLP) or the like that displays color images using micromirrors by a timesharing system.

Although in the embodiment the projector 2 and the computer 3 are connected via the USB cable 4, the invention is not limited to that, but may be connected via power line communication or LAN in which two-way communication is available.

Although the embodiment has a structure in which adjustment information set by the user-setting adjustment section 344 is written in the RAM 23 of the projector 2 at the completion of the system, the invention is not limited to that, but may have a structure in which the initial individual-difference information in the ROM 22 is also written, this operation being repeated.

It is to be understood that various modifications may be made within the spirit and scope of the invention.

The invention can be appropriately applied to projection systems whose projector has no image processor and in which a connected computer executes image processing.

The entire disclosure of Japanese Patent Application No. 2005-87915, filed Mar. 25, 2005 is expressly incorporated by reference herein.

What is claimed is:

1. A projection system comprising:
a projector that modulates the light emitted from a light source according to image information to form an optical image and projects the image in a magnified form; and
a computer connected to the projector via a signal input and output terminal,
wherein the projector projects the image according to the image information output from the computer; wherein the projector includes:
an adjustment operation section that adjusts the settings on the projector;
an adjustment operation identification section that identifies the adjustment operation indicated by an adjustment operation signal output from the adjustment operation section;
an adjustment-signal generating section that generates an image adjustment signal on the basis of the adjustment operation identified by the adjustment operation identification section; and
a two-way communication section that sends the generated image adjustment signal to the computer, and receives a signal from the computer; and
the computer includes:
a two-way communication section that receives the image adjustment signal from the projector, and sends a signal; and
an image processor that processes an image signal to be output, according to the received image adjustment signal.

2. The projection system according to claim 1, wherein the image processor comprises an adjustment-information display section outputting adjustment information for adjusting the settings to be projected on the projector.

3. The projection system according to claim 1, wherein the projector contains no image processor that processes an input image signal.

4. The projection system according to claim 1, wherein the projector comprises an individual-difference-information storage section that stores the individual-difference information of the projector light modulator properties; and
when the system starts, the two-way communication section outputs the individual-difference information to the computer.

5. The projection system according to claim 4, wherein the image processor comprises an adjustment-information output section that outputs, when the system exits, the adjustment information set by the image processor to the projector via the two-way communication section of the computer; and
the projector comprises an adjustment-information storage section that stores the input adjustment information.

6. A projector connected to a computer via a signal input and output terminal, the projector modulating the light emitted from a light source according to image information output from the computer to form an optical image, and projecting the image in a magnified form, wherein the projector comprises:
an adjustment operation section that adjusts the setting of the projector;
an adjustment operation identification section that identifies the adjustment operation indicated in an adjustment operation signal output from the adjustment operation section;
an adjustment-signal generating section that generates an image adjustment signal on the basis of the adjustment operation identified by the adjustment operation identification section; and
a two-way communication section that sends the generated image adjustment signal to the computer, and receives a signal from the computer.

* * * * *